United States Patent [19]
Warland et al.

[11] 4,131,032
[45] Dec. 26, 1978

[54] ROTARY DRIVE MEMBER

[75] Inventors: George W. Warland, Surbiton; Norman F. Crisp, Bookham, both of England

[73] Assignee: Borg-Warner Limited, Letchworth, England

[21] Appl. No.: 802,841

[22] Filed: Jun. 2, 1977

[51] Int. Cl.² .................. F16H 55/12; F16H 55/30; B21D 53/28
[52] U.S. Cl. .............................. 74/449; 29/159.2; 74/243 R
[58] Field of Search ............ 29/159.2; 74/243 R, 74/449, 230.8

[56]  References Cited
U.S. PATENT DOCUMENTS

| 2,724,975 | 11/1955 | Drummond | 74/449 X |
| 2,729,110 | 1/1956 | Killian et al. | 74/449 X |
| 3,796,106 | 3/1974 | Fisher et al. | 74/243 R |

Primary Examiner—Leonard H. Gerin
Attorney, Agent, or Firm—Robert L. Zieg

[57] ABSTRACT

A sprocket gear assembly comprising a sheet metal cup-shaped sprocket member having teeth formed from the sheet metal on an annular outer portion and a central hub having splines formed therein, the hub and outer portion being separated by a radial flange on each side of the sprocket assembly. The radial flange on one side is integral with the annular outer portion, and the hub may either be integral therewith and secured to a disc forming the other radial flange, or may be integral with the other radial flange and secured to said one radial flange, with the other radial flange welded to the annular outer portion. Alternatively the hub may be formed as a sheet metal component and is secured to the cup-shaped member.

13 Claims, 7 Drawing Figures

ROTARY DRIVE MEMBER

The present invention relates to a rotary drive member of sheet metal construction providing lightweight and high strength for operation as a torque transmission member.

The problem of providing a high-strength, but low cost rotary drive member, such as for example, drive sprockets for chains has been recognised in the prior art for some time. Approaches to this problem have been made which involve manufacturing such drive members, such as sprockets, from sheet metal by sheet metal forming techniques, however, such attempts so far have resulted in assemblies having a limited torque and strength capacity.

For example, U.S. Pat. No. 3,796,106 showing a sheet metal sprocket formed of a unitary piece has a radial flange on only one side. Other approaches to obtain sufficient strength in sprocket construction involve the well known methods of cutting a sprocket member from a forging and/or a casting which involves expensive machining work and results in a rather heavy structure having inertia beyond that desired.

The present invention overcomes the above identified problems of the prior art in that a varied lightweight and relatively strong rotary drive member construction is provided through the use of a cup-shaped sheet metal member having assembled thereto a support member having axially extending flanges on inner and outer diameters whereby a box-like construction results which is both lightweight and strong. In addition the engaging parts of the rotary members such as the gear teeth and the internal splines may be formed by sheet metal tools in the same sheet metal parts such that accuracy results without the necessity of any machining required.

BRIEF DESCRIPTION OF THE DRAWINGS

Referring to FIGS. 1 and 2 of the drawings, there is disclosed a unique rotary drive member or chain sprocket 10. The sprocket 10 is manufactured by sheet metal techniques such that no machining is required.

Figure 1:
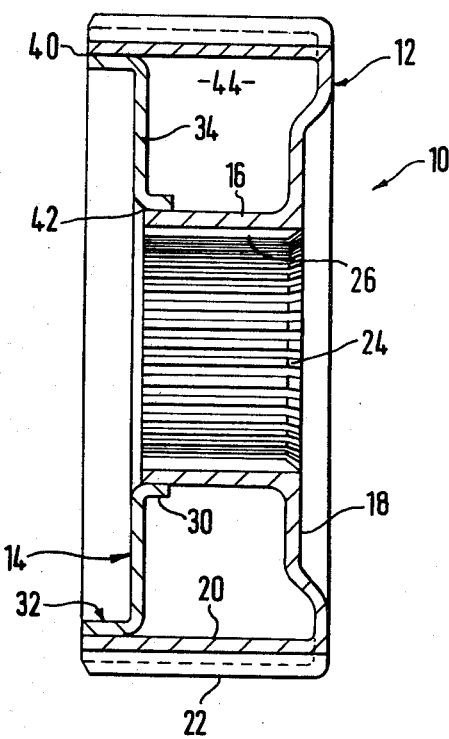
FIG. 1 is a sectional view through one embodiment of rotary drive member embodying the principles of the present invention and taken along the line 1—1 of FIG. 2.

Sprocket 10 includes a cup-shaped rotary drive member or sprocket 12 and a reinforcing disc or flange 14. Member 12 includes an inner annular hub 16 integral with a radially extending portion 18 which is also integral with an outer annular flange 20. Formed in the flange 20 are a series of sprocket teeth 22. Defined within the inner hub 16 is a central bore 24 which has formed therein a series of spines 26. The sprocket teeth 22 are formed by a pressing operation by using a number of tool elements which are ground to the required tooth profile and moved by cams in a sheet-metal-forming machine to form the shape illustrated in FIG. 2. This particular process may be similar to that shown in U.S. Pat. No. 3,796,085, but it is preferably effected as indicated in detail later in this specification.

Formed within the inner hub 16 are the series of spline teeth 26 which spline teeth may be formed by a partial extrusion process to develop the shape disclosed.

The cup-shaped member 12 has assembled thereto the reinforcing flange or support member 14 which is L-shaped. Member 14 includes an inner axially extending flange 30 and an outer axially extending flange 32 which are integral with a central radially extending portion 34. The member 14 is formed by sheet metal pressing techniques and is sized so that the flange 32 closely fits the inner diameter of flange 20 and the flange 30 closely fits the outer diameter of hub 16.

The member 14 is assembled to the cup-shaped sprocket 12 as shown in FIG. 1 and may be welded thereto as for example, at 40 and 42 to make a strong unitary assembly. Of course, other forms of joining members 14 and 12 may be used, such as arc welding, brazing, and so on. When the assembly 10 is made there is defined centrally thereof, a closed space or chamber 44 such that the parts together form a box-shaped structure. The box formed is annular in configuration. As will be apparent, the box shape is very strong considering the thickness of material used. Thus sufficient strength is provided by the sprocket 10 due to the formation of the box-like structure, which formation is completed by assembly of the member 14 to the cup-shaped sprocket member 12.

Figure 2:
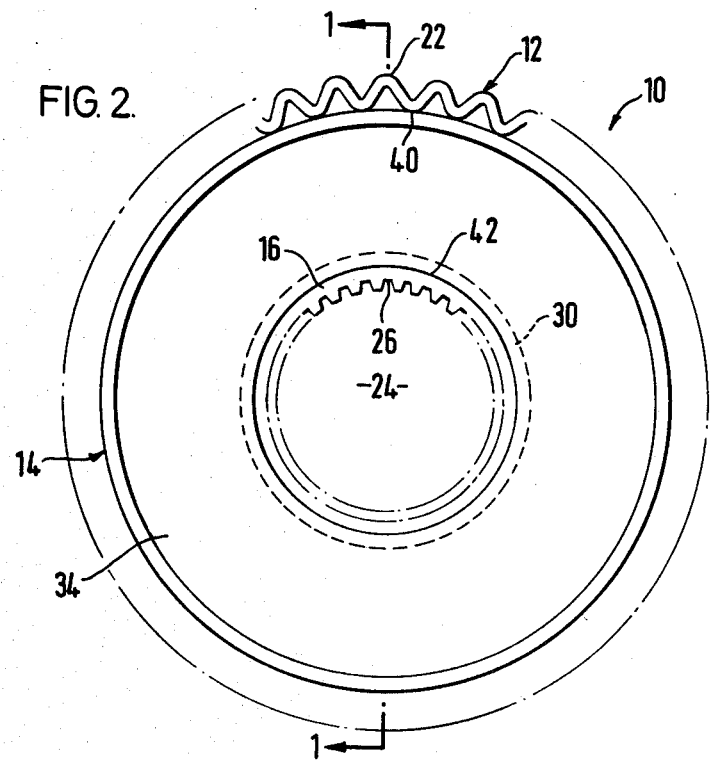
FIG. 2 is an elevation, with parts shown in section, of the member of FIG. 1.

By having sprocket teeth 22 formed by press techniques, a tooth profile is provided having an excellent finish, and as will be apparent a work hardening takes place at the surface of teeth 22 in the manufacture which helps to resist wear in operation. In addition, the advantage is provided that the spacing between the teeth 22 can be varied by the sheet metal tooling to make a reduction in noise, as has been found to result from variable spacing of teeth. In addition, the lightweight but strong construction illustrated in FIGS. 1 and 2 provides a driven assembly which has much less inertia than sprockets formed from forging and/or casting techniques. As will be apparent, although a sprocket assembly 10 is disclosed in this application by changing the form of the teeth 22, the member 10 can be manufactured as a gear or any other known type of internal or external toothed drive member and can be made by the method described herein. To summarise the methods/steps involved in manufacturing the unique sprocket assembly 10, they are as follows:

1. Forming a cup-shaped member from a disc and forming an outer annular flange and an inner annular hub.
2. Preforming an initial portion of the teeth adjacent the radially extending portion 18.
3. Forming teeth to their final form in the outer flange by means of radially operating tool members.
4. Forming splines by a partial extrusion technique on the inner annular hub.
5. Forming a support member having axially extending flanges at inner and outer diameters.
6. Assembling the support member within the cup-shaped member.
7. Welding the support 14 in place to produce a uniform strong assembly.

The above method has considerable advantages over that disclosed in U.S. Pat. No. 3,796,085 insofar as it significantly reduces tool wear and therefore produces a better product, in the long term. The teeth are preformed at the end adjacent the portion 18, after the drawing of the annular flange. The main forming to the final form is effected by radial movement of separate tool members guided in radial keyways.

Figure 3:
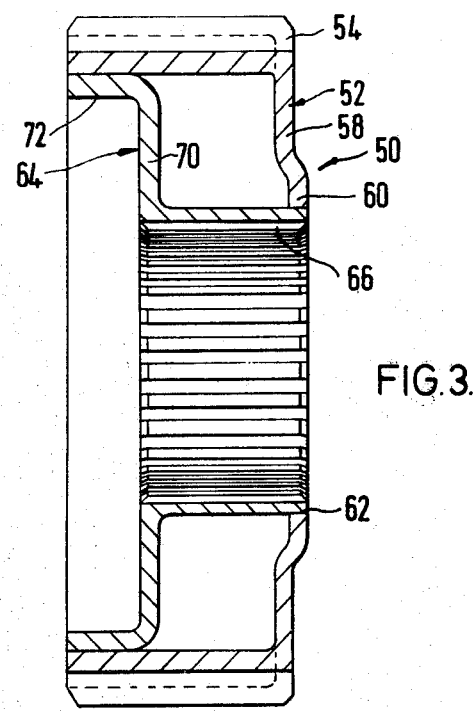
FIG. 3 is a sectional view taken along the line 3—3 of FIG. 4 of a second embodiment of rotary drive member according to the present invention.
Figure 4:
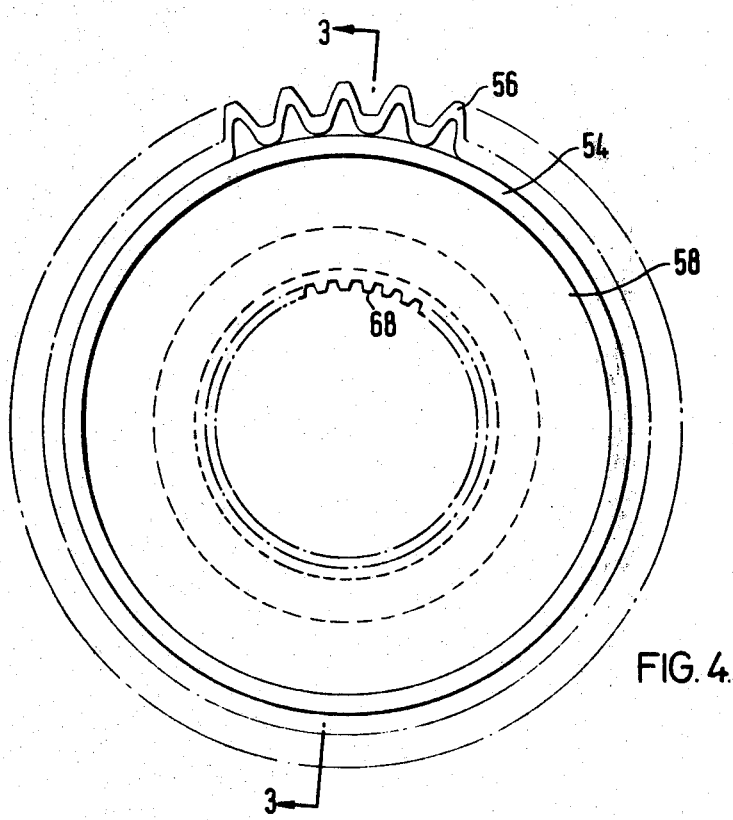
FIG. 4 is an end elevation, partly in section, of the construction of FIG. 3.

Referring now to FIGS. 3 and 4 of the drawings, a rotary drive member or chain sprocket 50 is illustrated, this sprocket 50 being manufactured by sheet metal techniques so that no machining is required. Sprocket 50 includes a cup-shaped member 52 including an outer annular generally cylindrical flange 54 formed with a series of sprocket teeth 56. Integrally formed with the flange 54 is a generally radially inwardly extending portion 58 which is flared slightly at the central portion 60 in which is formed a central aperture 62.

A second sheet metal member 64 comprises an inner tubular axially extending flange or hub portion 66 having formed therein spline teeth 68. Radially outwardly extending from the hub 66 is a radial portion 70 having, at its periphery, an axially extending outer flange portion 72.

As can be seen in the drawings, the hub portion 66 extends into the aperture 62 and the flange portion 72 extends into the outer annular portion 54 and contacts the inner portions of the teeth 56 thereof. The thus-formed annular box channel lightweight assembly is secured together by welding the flange portion 72 to the outer flange 54 and by welding the hub 66 into the aperture 62.

The sheet metal forming can be carried out precisely as before using a similar technique to that mentioned with regard to FIGS. 1 and 2 of the drawings.

Figures 5, 6:
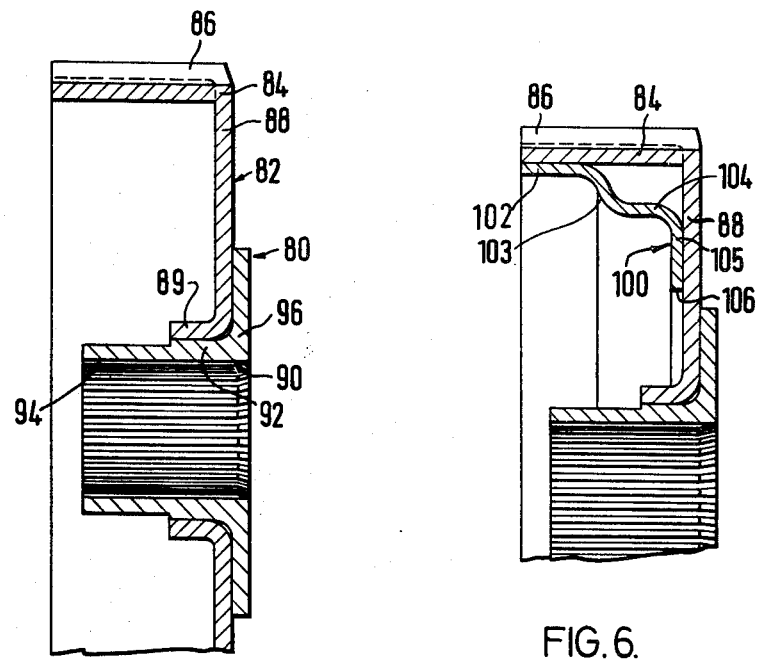
FIGS. 5, 6 and 7 are sectional views showing three further embodiments of rotary drive member according to the present invention.

The construction illustrated in FIG. 5 is indicated by the general reference numeral 80 and comprises a sheet metal cup-shaped member 82 having an axially extending outer flange portion 84 formed into sprocket teeth 86 at its periphery. A radially inwardly extending flange portion 88 is formed integrally at one end of the outer axial flange portion 84 and this has an inner axially extending generally cylindrical tubular portion 89 at its inner periphery.

A further sheet metal hub member 90 comprises a generally cylindrically extending sheet metal hub portion 92 formed with spline teeth 94 thereon. At its right-hand end, as viewed in the drawings, the member 90 is formed with a radially outwardly extending flange portion 96. The radially extending parts 96 and 88 are welded together to provide a unitary structure.

In use, since this structure is open at its left axial end, a bearing member or seal may be inserted into the interior of the cup-shaped member 82 to surround the hub portion 92. The outer surface of the hub portion may be machined down, as shown, to accept such a bearing or seal.

FIG. 6 illustrates a similar structure and like parts have been indicated by like reference numerals. This element, however, also includes a further generally cup-shaped member 100, again formed of sheet metal, and having an outer axially extending portion 102, a circumferential shoulder 103, a further smaller diameter axially extending portion 104 and a radially inwardly extending portion 105 defining a central aperture 106 therein. This member 100 is welded to the portion 88 and to the inner ends of the teeth portion 86 of the axially extending outer flange 84. The member 100 further rigidifies the structure of the sprocket.

Figure 7:
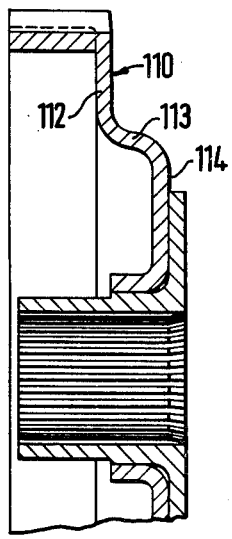

The arrangement illustrated in FIG. 7, is generally similar to that illustrated in FIG. 5 except that the radially extending end flange portion 88 of FIG. 5 is replaced by a portion 110 having an outer radially extending portion 112, a circumferential shoulder 113, and an inner radially extending portion 114. The effect of this is again to rigidify the structure of the sprocket, but it does reduce the axial length of the sprocket teeth thereof.

The various features of the invention have been particularly shown and described, however, it should be obvious to one skilled in the art that modifications may be made therein without departing from the scope of the invention.

What is claimed is:

1. A rotary drive member comprising a cup-shaped sheet metal member having an outer axially extending flange, a series of teeth formed in said outer flange for driving relationship of said member with an associated drive member, a first radial portion extending inwardly from one axial end of said outer axially extending flange and a second sheet metal radial portion extending inwardly from the other axial end of said outer axially extending flange and an inner flange portion forming a hub of said drive member, and connected to said first and second radial portion, wherein a lightweight, high-strength box-shaped annular sheet metal rotary member is provided.

2. A rotary drive member comprising a cup-shaped sheet metal member having an outer axially extending flange, a series of teeth formed in said outer flange for driving relationship of said member with an associated drive member, a radial portion extending inwardly from one axial end of said outer axially extending flange, a sheet metal disc formed with outer and inner axially extending flange portions, said inner flange portion forming a hub of said drive member secured to said radial portion, said outer flange portion secured to the opposite axial end of said outer axial flange of said cup-shaped sheet metal member, wherein a lightweight, high strength, box-shaped annular sheet metal rotary member is provided.

3. A rotary drive member as claimed in claim 2, wherein said hub of said drive member has a series of teeth formed therein to provide for driving relationship of said member with a drive shaft.

4. A member as claimed in claim 2, wherein the flanges on said disc are secured to said cup-shaped sheet metal member by welding.

5. A member as claimed in claim 2, wherein the flanges on said disc extend in opposite axial directions.

6. A rotary drive member comprising a cup-shaped sheet metal member having an inner axially extending hub and an outer axially extending flange and having a radial portion interconnecting said hub and flange on one side of said member, a series of teeth formed in said outer flange to provide for driving relationship of said member with an associated drive member, a disc formed with outer and inner axially extending flanges and mounted in said rotary drive member on the opposite side of said drive member from said radial portion, wherein a lightweight, high strength, box-shaped annular sheet metal rotary member is provided.

7. A member as claimed in claim 6, wherein the flanges on said disc closely fit with the flange and hub on said cup-shaped sheet metal member and are secured thereto.

8. A member as claimed in claim 7, wherein the flanges on said disc are secured to said member by welding.

9. A member as claimed in claim 7, wherein the flanges on said disc extend in opposite axial directions.

10. A rotary drive member comprising a cup-shaped sheet metal member having an outer axially extending flange a series of teeth formed in said outer flange for driving relationship of said member with an associated drive member, a radial portion extending inwardly from one axial end of said outer axially extending flange and defining a central aperture therein, the sheet metal tubular hub inserted in said aperture, a radially outwardly extending flange on said sheet metal hub, and means securing said radial flange of said hub to said radial portion of said cup-shaped member.

11. A member as claimed in claim 10, wherein said radial flange and radially inwardly extending portion are secured together by welding.

12. A member as claimed in claim 10, and further comprising teeth formed on the inner surface of said hub.

13. A method of forming a rotary drive member from sheet metal, in which a disc is formed, in a press, into an annular cup-shaped member with a radial portion and a peripheral axial portion, the peripheral axial portion having teeth therein, the improvement consisting in that:

the portion of the teeth adjacent the radial portion are preformed, during axial movement of the press, and the teeth are formed in their final shape by subsequent radial operation of further tool members.

* * * * *